(12) United States Patent
Reiser

(10) Patent No.: US 7,533,864 B1
(45) Date of Patent: May 19, 2009

(54) CAKE BATTER SEPARATOR

(76) Inventor: Robert S. Reiser, 3333 Scioto Farms Dr., Hilliard, OH (US) 43026

(*) Notice: Subject to any disclaimer, the term of this patent is extended or adjusted under 35 U.S.C. 154(b) by 520 days.

(21) Appl. No.: 11/303,246

(22) Filed: Dec. 16, 2005

(51) Int. Cl.
*A21C 11/12* (2006.01)

(52) U.S. Cl. .................. 249/117; 249/128; 249/131; 249/132; 99/426; 426/523

(58) Field of Classification Search ............ 249/117, 249/128–132, DIG. 1; 99/422, 426, DIG. 15; 426/523
See application file for complete search history.

(56) References Cited

U.S. PATENT DOCUMENTS

| | | | | |
|---|---|---|---|---|
| 872,837 | A | * | 12/1907 | Mio .................. 249/157 |
| 2,161,624 | A | * | 6/1939 | Hoerr ................. 220/551 |
| 2,268,637 | A | * | 1/1942 | Bernstein ............. 99/537 |
| 2,327,988 | A | * | 8/1943 | Bassett ............... 249/74 |
| 3,060,838 | A | * | 10/1962 | Priore ................ 99/430 |
| 4,889,253 | A | * | 12/1989 | Schmulian et al. ...... 220/551 |
| 4,966,295 | A | * | 10/1990 | Parrish ............... 220/576 |
| 5,074,777 | A | * | 12/1991 | Garner ............... 425/289 |
| 5,968,577 | A | * | 10/1999 | Roecker .............. 426/523 |
| 6,287,619 | B1 | * | 9/2001 | Khan ................. 426/523 |

OTHER PUBLICATIONS

K & S Cake Batter Separator, offered for sale by "Confectionary House", retrieved from <url: http://www.confectioneryhouse.com/?Screen=PROD&Product_Code=KBE0351482>, on Nov. 27, 2005.

* cited by examiner

*Primary Examiner*—Yogendra Gupta
*Assistant Examiner*—Thu Khanh T Nguyen
(74) *Attorney, Agent, or Firm*—Ronald J. Koch

(57) ABSTRACT

A cake batter separator has first dividing wall 40 having a front surface 40A, a back surface 40B, a top edge 40C, a bottom edge 40D, a proximal side edge 40E, and a distal side edge 40G. The top portion of proximal side edge 40E of first dividing wall 40 has a hook shaped protrusion 40F extending outward away from the distal side edge 40G. A second dividing wall 50 has a front surface 50A, a back surface 50B, a top edge 50C, a bottom edge 50D, a proximal side edge 50F, a distal side edge 50G, and an upwardly facing channel 50H attached to front surface 50A. The top portion of distal side edge 50G of second dividing wall 50 has a hook shaped protrusion 50E extending outward away from the proximal side edge 50F.

8 Claims, 5 Drawing Sheets

CAKE BATTER SEPARATOR

CROSS REFERENCE TO RELATED APPLICATIONS

Not Applicable

FEDERALLY SPONSORED RESEARCH

Not Applicable

SEQUENCE LISTING, TABLE, OR COMPUTER PROGRAM COMPACT DISK APPENDIX

Not Applicable

BACKGROUND OF THE INVENTION

Field of Invention

This invention relates to cake batter separators for use in baking cakes or other confectionary items.

REFERENCE NUMERALS IN DRAWINGS

Figure 1A:
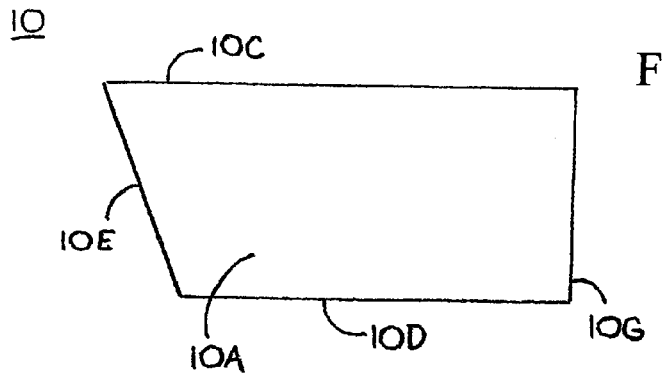
FIG. 1A shows a side view of first dividing wall 10.
Figure 1B:
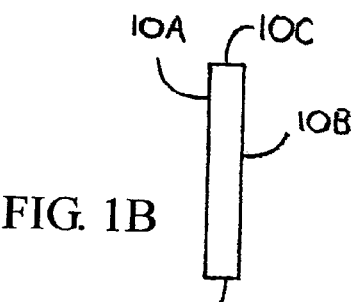
FIG. 1B shows an end view of first dividing wall 10 of FIG. 1A.

The table below lists the reference numerals employed in the figures, and identifies the element designated by each numeral.
10 first dividing wall 10
10A front surface 10A
10B back surface 10B
10C top edge 10C
10D bottom edge 10D
10E proximal side edge 10E
10G distal side edge 10G
20 second dividing wall 20
20A front surface 20A
20B back surface 20B
20C top edge 20C
20D bottom edge 20D
20F proximal side edge 20F
20G distal side edge 20G
20H upwardly facing channel 20H
40 first dividing wall 40
40A front surface 40A
40B back surface 40B
40C top edge 40C
40D bottom edge 40D
40E proximal side edge 40E
40G distal side edge 40G
40F hook shaped protrusion 40F
50 second dividing wall 50
50A front surface 50A
50B back surface 50B
50C top edge 50C
50D bottom edge 50D
50F proximal side edge 50F
50G distal side edge 50G
50H upwardly facing channel 50H
50E hook shaped protrusion 50E
30 cake pan 30
30A cake pan side 30A
30B cake pan side 30B
30C cake pan bottom 30C
30D tabletop 30D
60 cake pan 60
60A cake pan side 60A
60B cake pan side 60B
60C cake pan bottom 60C
60D tabletop 60D

BACKGROUND

Prior Art

It is often desirable to purchase cakes, such as birthday cakes or cakes for special occasions, that have the "cake material" (distinguished from the cake icing) of more than one flavor. Oftentimes there is only one cake per event. Yet, not all guests like the same flavor. The cost of cakes often necessitates that the host buy only one cake, and the cake may be large.

In earlier times one wishing to create such a cake had to improvise and use cardboard cut outs or purchase single size cake batter separators designed specifically for each type of pan. This has been problematic for various reasons.

Improvisational techniques often lead to messy looking transitions between cake types. This is undesirable. Purchasing separators for every pan is undesirable since there are so many different sizes of cakes and cake pans.

The "K & S Cake Batter Separator", retrieved from <url:http://www.confectioneryhouse.com/?Screen=PROD&Product_Code=KBE0351482>, on Nov. 27, 2005, shows a cake batter separator that only fits cake pans of one width. Furthermore, the pan must have straight sides. This is problematic because a different cake batter separator must be purchased for cake pans with varying widths and varying sidewall angles. It does fit cake pans of varying lengths, so long as the width matches the width of the cake batter separator. It is known in the art that many cake pans have angled or beveled sides and that cake pans having straight sides are more expensive.

SUMMARY

It is therefore an object of this invention to provide a cake batter separator that is adjustable to accommodate cake pans of varying widths and shapes. Using a combination of dividing walls that are removably engaged to each other and can move laterally with respect to each other allows one to simply place the combination within the cake pan and extend the length to fit the pan being used. This method works for rectangular and non-rectangular cake pans. In fact, it works for cake pans having unique shapes such as cartoon characters. It is a further object of this invention to provide a cake batter separator that accommodates cake pans having both straight (vertical) and angled (beveled) sides. Using a combination of dividing walls that each have one end being straight and the other end being angled allows one to choose which end to use depending on the wall of the cake pan. The matching end is placed in the outward facing position on both dividing walls and extended to fit the width of the cake pan.

It is a further object of this invention to provide a cake batter separator that permits one to separate different types of batters in the same pan without having to buy a different cake batter separator for cake pans of different widths and sidewall angles.

GENERAL EMBODIMENT

An apparatus for separating cake batter has a first dividing wall 10 having a front surface 10A, a back surface 10B, a top edge 10C, a bottom edge 10D, a proximal side edge 10E, and a distal side edge 10G. A second dividing wall 20 has a front surface 20A, a back surface 20B, a top edge 20C, a bottom edge 20D, a proximal side edge 20F, a distal side edge 20G, and an upwardly facing channel 20H attached to front surface 20A.

Figure 2A:
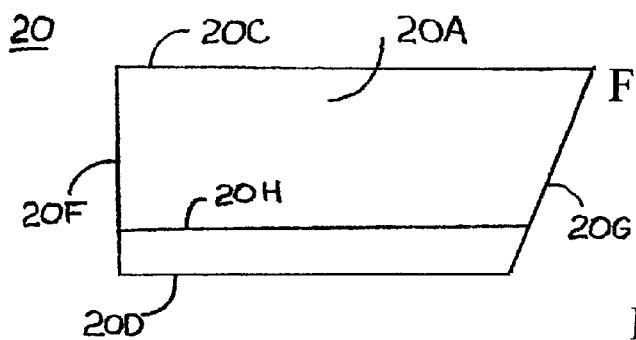
FIG. 2A shows a side view of second dividing wall 20.
Figure 2B:
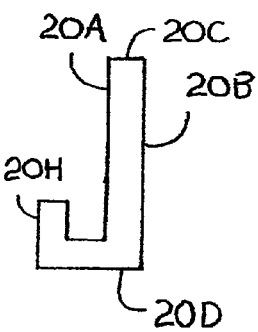
FIG. 2B shows an end view of second dividing wall 20 OF FIG. 2A.
Figure 2C:
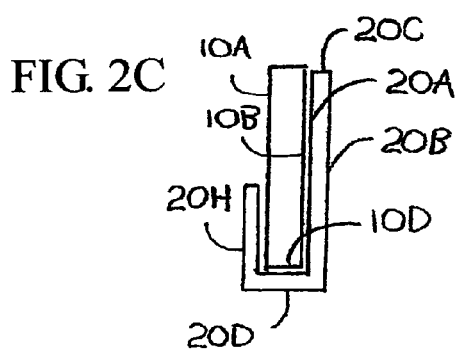
FIG. 2C shows an end view of first dividing wall 10 removably attached to second dividing wall 20.

As depicted in FIG. 2C, the first and second dividing walls are removably attached to form a combination by inserting the bottom edge 10D of first dividing wall 10 into the upwardly facing channel 20H of second dividing wall 20, so that the back surface 10B of the first dividing wall 10 is adjacent to the front surface 20A of second dividing wall 20. The channel 20H is of sufficient width to allow minimal clearance between it and the first dividing wall 10. This allows the two dividing walls to move laterally with respect to each other while being stable with respect to each other. The lateral movement of the first 10 and second 20 dividing walls permits the user to accommodate cake pans of different widths.

Figure 4A:
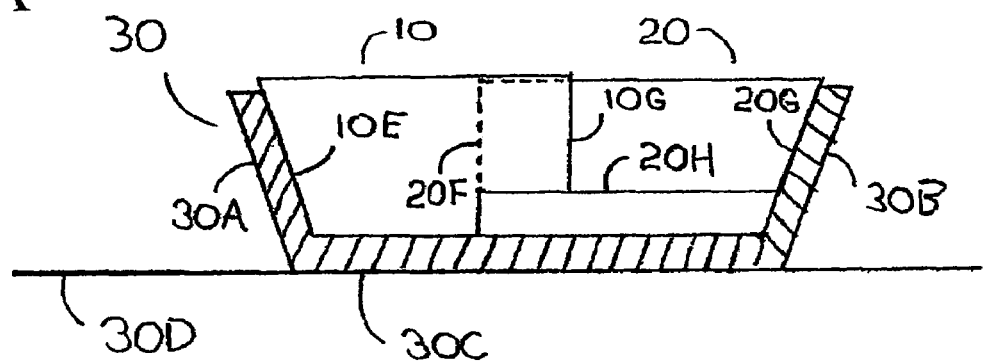
FIG. 4A shows a lateral cross-sectional view of first dividing wall 10 removably attached to second dividing wall 20 inserted inside Cake pan 30.
Figure 6C:
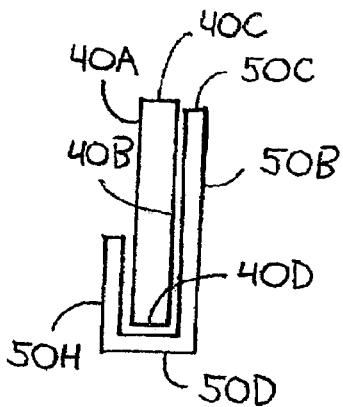
FIG. 6C shows an end view of first dividing wall 40 removably attached to second dividing wall 50.
Figure 7A:
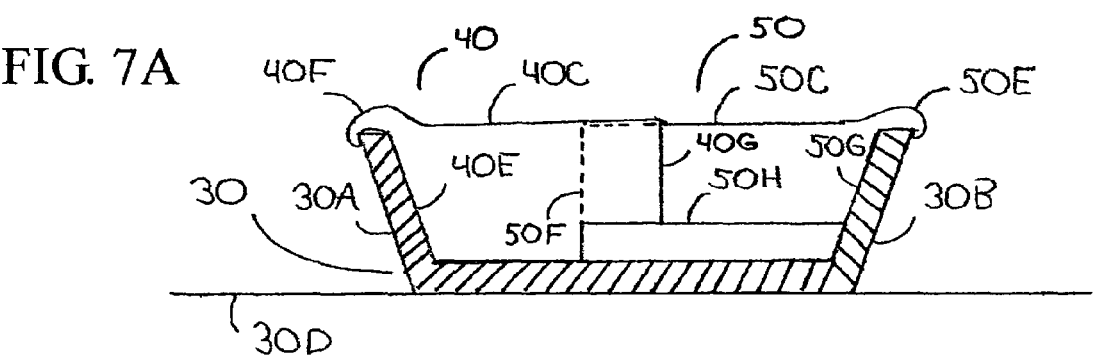
FIG. 7A shows a lateral cross-sectional view of first dividing wall 40 removably attached to second dividing wall 50 inserted inside Cake pan 30.

In this combination, as further depicted in FIG. 4A, proximal side edge 10E of first dividing wall 10 and distal side edge 20G of second dividing wall 20 face outward away from each other. The first and second dividing walls can be moved laterally with respect to each other thereby allowing the overall length of the combination to be adjusted. As shown in FIGS. 6C and 7A, an analogous relationship exists for dividing walls 40 and 50.

The upwardly facing channel serves to allow the two dividing walls to be removably attached. Other methods may be used. For instance, the dividing walls may be made of magnetic material allowing them to be removably attached without the need of the channel. This embodiment is not preferred (although it does work) because magnetic materials are not always dishwasher safe and the magnetism prevents the dividing walls from being smoothly moved laterally with respect to each other. Other methods for removable attachment may be used so long as the dividing walls can move laterally with respect to each other.

Figure 3:
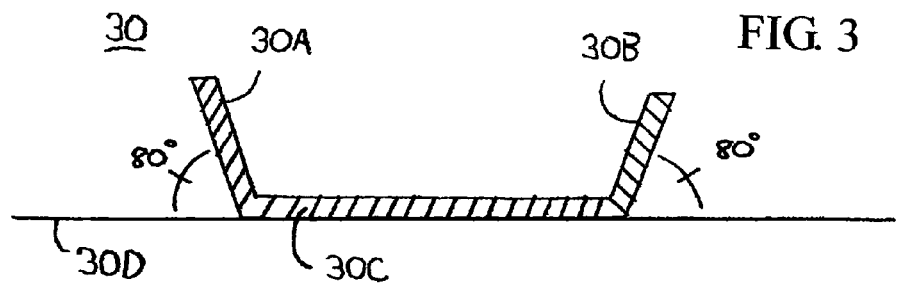
FIG. 3 shows a lateral cross-sectional view of Cake pan 30.

Most conventional cake pans have sides at angles of approximately 80 degrees with respect to a tabletop 30D on which they are placed (see FIG. 3). It is advantageous to provide dividing walls with parallel side edges having angles of 80 degrees. This embodiment is preferred because having the dividing wall edges parallel with the side of the cake pan prevents seepage of cake batter between the two sides thus providing a distinct transition between cake types. Such a distinct transition has greater aesthetic appeal versus an incongruous transition. This transition will most often be hidden because of icing covering the cake. This preferred embodiment is depicted in FIG. 4B.

Figure 4B:
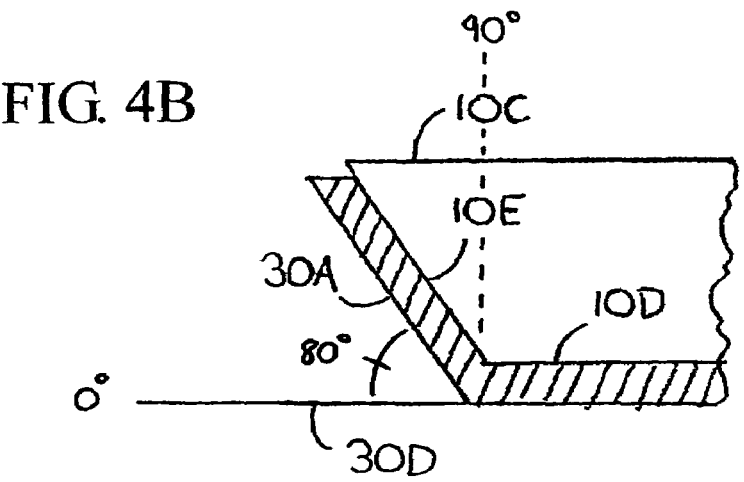
FIG. 4B shows a fragmentary, lateral cross-sectional view of first dividing wall 10 inside of cake pan 30.

FIG. 4B shows the proximal side edge 10E of first dividing wall 10 is parallel to the side of the cake pan 30A and has an angle of approximately 80 degrees with respect to tabletop 30D. The bottom edge 10D of first dividing wall 10 is parallel to the tabletop 30D. A corresponding relationship exists for distal side edge 20G and bottom edge 20D of second dividing wall 20, and tabletop 30D.

The angular relationships can be alternatively described by referencing the side edges of the dividing walls to the bottom edge of the dividing walls. Instead of the angle varying from 0 degrees to 90 degrees, it would vary from 90 degrees to 180 degrees with respect to the bottom edge of the dividing walls.

Figure 7B:
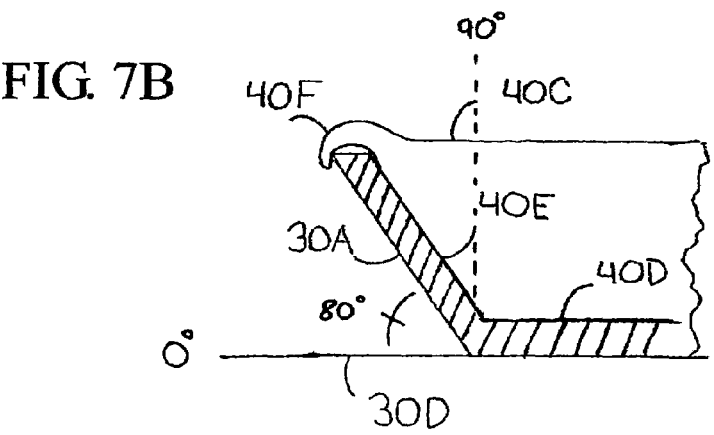
FIG. 7B shows a fragmentary, lateral cross-sectional view of first dividing wall 40 inside of cake pan 30.

This angle is preferably 80 degrees but can vary. The angle could be 90 degrees (i.e. vertical with respect to the tabletop). The angle could be varied towards 0 degrees (see FIGS. 4B and 7B).

It is not critical that the angle of the side edge of a dividing wall exactly match the angle of the side wall of the cake pan because the viscosity of the cake batter makes it thick enough so that it will not leak through the small gap created. In fact, after the cake batter is dispensed into the cake pan with the dividing wall combination in place, the dividing wall may be removed entirely with little or no adverse effect. The cake batter will remain segregated after the dividing wall is removed.

Regarding the foregoing discussion of the angles of the side edges of the dividing walls, an analogous relationship exists for first dividing wall 40 and second dividing wall 50.

One advantage of the present invention is that it accommodates cake pans having both straight (vertical) and angled (beveled) sides. FIG. 4A depicts use on a cake pan having angled sides. First dividing wall 10 is removably attached to second dividing wall 20 and the combination is inserted into cake pan 30. The dividing walls are then moved laterally with respect to each other. Proximal side edge 10E of first dividing wall 10 is extended outward and engages cake pan side 30A and distal side edge 20G of second dividing wall 20 is extended outward and engages cake pan side 30B.

Figure 8A:
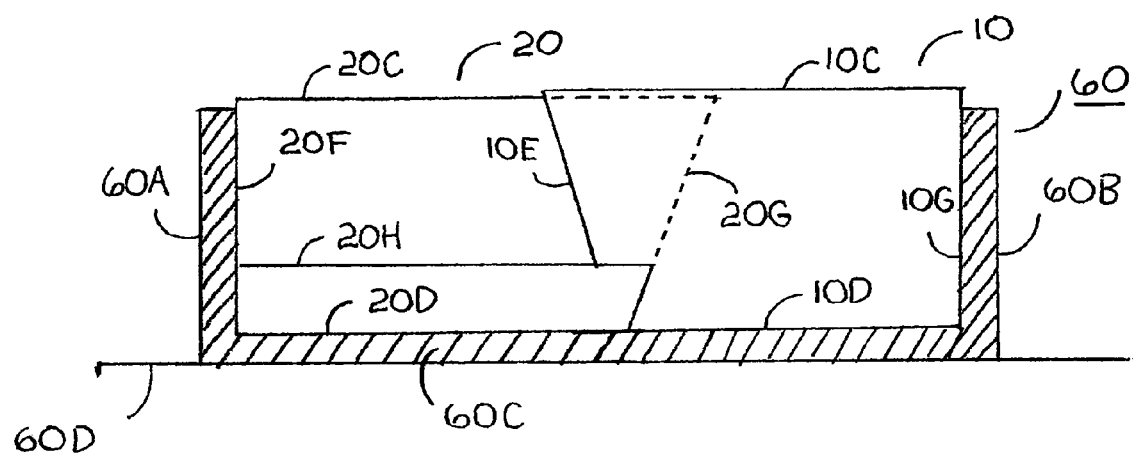
FIG. 8A shows a lateral cross-sectional view of first dividing wall 10 removably attached to second dividing wall 20 inserted inside Cake pan 60.

FIG. 8A depicts use on a cake pan having straight sides. First dividing wall 10 is removably attached to second dividing wall 20 and the combination is inserted into cake pan 60. The dividing walls are then moved laterally with respect to each other. Distal side edge 10G of first dividing wall 10 is extended outward and engages cake pan side 60B and proximal side edge 20F of second dividing wall 20 is extended outward and engages cake pan side 60A. In this configuration, the angled sides (10E and 20G) of first and second dividing walls (10 and 20) face inward towards each other and do not make contact with the cake pan side walls.

Figure 5A:
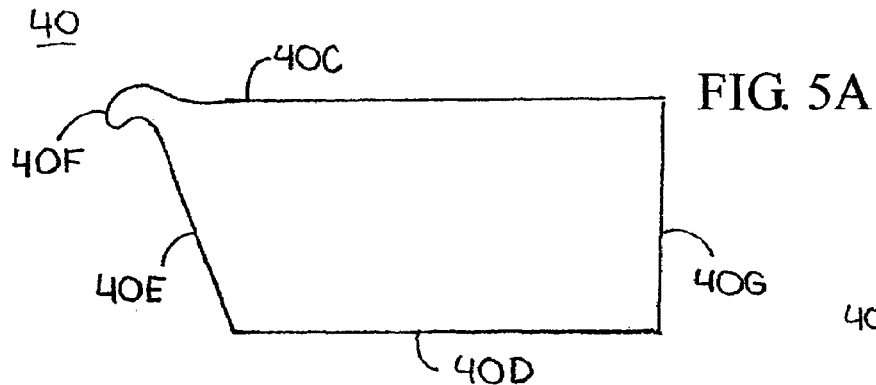
FIG. 5A shows a side view of first dividing wall 40.
Figure 5B:
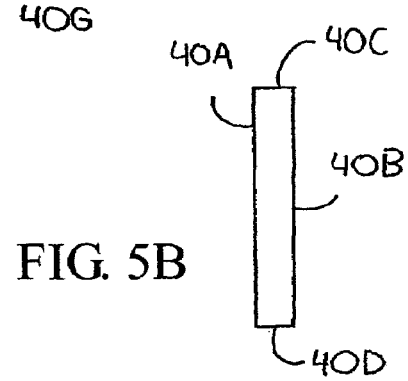
FIG. 5B shows an end view of first dividing wall 40 of FIG. 5A.
Figure 6A:
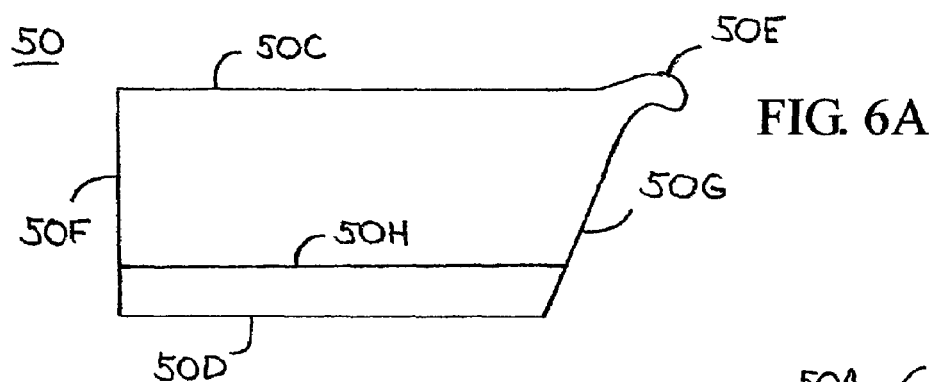
FIG. 6A shows a side view of second dividing wall 50.

A preferred embodiment, depicted in FIGS. 5A, 6A, and 7A, has a first dividing wall 40 having a front surface 40A, a back surface 40B, a top edge 40C, a bottom edge 40D, a proximal side edge 40E, and a distal side edge 40G. The top portion of proximal side edge 40E of first dividing wall 40 has a hook shaped protrusion 40F extending outward away from the distal side edge 40G.

A second dividing wall 50 has a front surface 50A, a back surface 50B, a top edge 50C, a bottom edge 50D, a proximal side edge 50F, a distal side edge 50G, and an upwardly facing channel 50H attached to front surface 50A. The top portion of distal side edge 50G of second dividing wall 50 has a hook shaped protrusion 50E extending outward away from the proximal side edge 50F.

As depicted in FIG. 7A, the hook shaped protrusions 40F and 50E are removably engaging the sides 30A and 30B of the cake pan, respectively. This embodiment provides added stability and enables the dividing walls (alone or in combination) to stand upright independently and also provides added stability by preventing the dividing walls from moving laterally with respect to each other after the combination has been placed in the desired position. The protrusions 40F and 50E do not have to be hook shaped, but rather can be any shape that allows the dividing walls to removably engage the sides of the pan.

In a preferred embodiment, depicted in FIG. 2B, the bottom edge 20D of the second dividing wall 20 has a flat horizontal portion. This flat portion provides additional support allowing the dividing wall to stand independently upright in the cake pan 30. As shown in FIG. 6C, an analogous relationship exists for dividing walls 40 and 50.

The bottom edge 20D of second dividing wall 20 has an upwardly facing channel 20H. As shown in FIG. 2B, the channel can be u-shaped and form the basis of the flat portion in conjunction with the bottom edge 20D serving to provide added support allowing the second dividing wall 20 to stand independently in the cake pan 30. The upwardly facing channel 20H can be any shape that allows the insertion of the bottom edge 10D of the first dividing wall 10. For instance, it could be u-shaped, c-shaped, or shaped like a semi-circle. The upwardly facing channel can also be a trough.

Figure 6B:
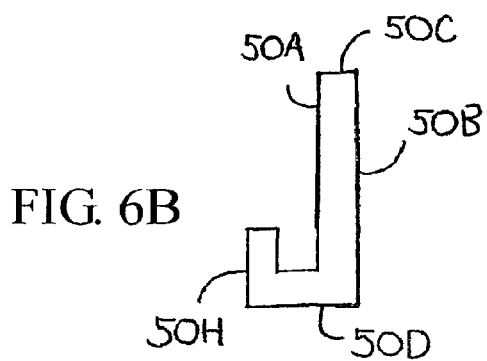
FIG. 6B shows an end view of second dividing wall 50 of FIG. 6A.

The bottom edge 50D of second dividing wall 50 has an upwardly facing channel 50H. As shown in FIG. 6B, the channel can be u-shaped and form the basis of the flat portion in conjunction with the bottom edge 50D serving to provide added support allowing the second dividing wall 50 to stand independently in the cake pan 30. The upwardly facing channel 50H can be any shape that allows the insertion of the bottom edge 40D of the first dividing wall 40. For instance, it could be u-shaped, c-shaped, or shaped like a semi-circle. The upwardly facing channel can also be a trough.

The present invention may be made of any substance, such as plastic, metal, or wood, having sufficient rigidity to substantially maintain shape as the cake batter, or any similar substance, is dispensed into the cake pan 30. Plastic is preferred because of the light weight and because it is generally dishwasher safe.

The heights of the dividing walls may be altered to facilitate use in cake pans of varying depth. Generally, cake pans are approximately one and three quarter to two inches in depth. Therefore, the dividing walls should be at least two inches high. The dividing walls can be higher than the depth of the cake pan with no loss in effectiveness.

Most cake pans are rectangular with the width being approximately 9 inches. Accordingly, it is preferable that the dividing walls be long enough so that, when removably attached to each other, the overall length of the combination covers the range including 9 inches.

Another advantage of the present invention is that it may be used in non rectangular pans. It is known in the art that cake pans come in shapes other than rectangular. For instance, some pans, called character pans, are shaped like popular characters (cartoons, etc.) The present invention may also be used in these pans in the same manner described elsewhere herein. The user simply places the combination of removably attached dividing walls inside the pan and extends outwards until the dividing walls are adjacent to the sides of the pan.

CONCLUSION

It will be apparent to those skilled in the art that the objects of this invention have been achieved as described herein by providing a cake batter separator that accommodates cake pans of varying widths and sidewall angles. The user simply chooses which end (vertical or angled, depending on the type of pan) to extend outward and then removably attaches two dividing walls together (forming a combination) with the desired ends facing outwards. The combination is then extended until the outer edges of the dividing walls make contact with the side walls of the cake pan. Doing so effectively creates two distinct sections within the cake pan into which two different types of cake batters (or other material) are poured, respectively. The combination is then removed from the cake pan. The cake batter is of sufficient viscosity so that the two cake batters do not merge with each other. The end result (after baking) being one cake with two separate flavors. The present invention is not limited to use with rectangular cake pans. It can also be used with specially shaped cake pans.

More sidewall pairs (combinations) can be used to make cakes having more than two different flavors. For instance, two combinations could be used to make a cake that has three flavors.

I claim:

1. An apparatus for separating cake batter comprising:
   a first dividing wall having,
      a front surface,
      a back surface,
      a proximal side edge,
      a distal side edge,
      a top edge,
      a bottom edge,
   a second dividing wall having,
      a front surface,
      a back surface,
      a proximal side edge,
      a distal side edge,
      a top edge,
      a bottom edge having an upwardly facing channel capable of receiving said bottom edge of said first dividing wall,
   wherein said first and second dividing walls are capable of being removably attached to each other by vertically inserting said bottom edge of said first dividing wall into said upwardly facing channel of said second dividing wall,
   further wherein said first and second dividing walls are capable of moving laterally and vertically with respect to each other.

2. The apparatus of claim 1 further comprising:
   said bottom edge of said second dividing wall having a flat bottom,
   wherein said second dividing wall can stand independently upright,
   further wherein said first and second dividing walls are capable of being removably attached and standing independently upright in combination.

3. The apparatus of claim 1 further comprising:

said proximal side edge of said first dividing wall having an angle of between 90 and 180 degrees with respect to said bottom edge of said first dividing wall, said distal side edge of said second dividing wall having an angle of between 90 and 180 degrees with respect to said bottom edge of said second dividing wall.

4. The apparatus of claim 3 further comprising:

said bottom edge of said second dividing wall having a flat bottom, wherein said second dividing wall can stand independently upright, further wherein said first and second dividing walls are capable of being removably attached and standing independently upright in combination.

5. The apparatus of claim 1 further comprising:

the top portion of said proximal side edge of said first dividing wall having a hook shaped protrusion extending outward away from said distal side edge of said first dividing wall, the top portion of said distal side edge of said second dividing wall having a hook shaped protrusion extending outward away from said proximal side edge of said second dividing wall, wherein said hook shaped protrusion of said proximal side edge of said first dividing wall and said hook shaped protrusion of said distal side edge of said second dividing wall may be positioned distal with respect to each other.

6. The apparatus of claim 5 further comprising:

said bottom edge of said second dividing wall having a flat bottom, wherein said second dividing wall can stand independently upright, further wherein said first and second dividing walls are capable of being removably attached and standing independently upright in combination.

7. The apparatus of claim 5 further comprising:

said proximal side edge of said first dividing wall having an angle of between 90 and 180 degrees with respect to said bottom edge of said first dividing wall, said distal side edge of said second dividing wall having an angle of between 90 and 180 degrees with respect to said bottom edge of said second dividing wall.

8. The apparatus of claim 7 further comprising:

said bottom edge of said second dividing wall having a flat bottom, wherein said second dividing wall can stand independently upright, further wherein said first and second dividing walls are capable of being removably attached and standing independently upright in combination.

\* \* \* \* \*